US006528607B2

United States Patent
Reusmann

(10) Patent No.: US 6,528,607 B2
(45) Date of Patent: Mar. 4, 2003

(54) HEAT-STABLE, CORROSION-INHIBITING POLYORGANOSILOXANE RESINS

(75) Inventor: Gerhard Reusmann, Essen (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/909,209

(22) Filed: Jul. 19, 2001

(65) Prior Publication Data

US 2002/0028296 A1 Mar. 7, 2002

(30) Foreign Application Priority Data

Jul. 22, 2000 (DE) ......................... 100 35 755

(51) Int. Cl.[7] .................. C08G 77/01; C08G 77/14
(52) U.S. Cl. ................... 528/27; 525/476; 528/29
(58) Field of Search .................. 525/476; 528/27, 528/29

(56) References Cited

U.S. PATENT DOCUMENTS

| 3,154,597 A | * | 10/1964 | McWhorter ............... 525/523 |
| 4,113,665 A | * | 9/1978 | Law et al. ............... 524/779 |
| 4,283,513 A | * | 8/1981 | Mikami .................. 525/476 |
| 4,368,294 A | * | 1/1983 | Deubzer et al. .......... 525/100 |
| 4,972,029 A | * | 11/1990 | Herzig et al. ............ 525/487 |
| 5,516,858 A | | 5/1996 | Morita et al. |
| 5,684,095 A | * | 11/1997 | Morimoto et al. ......... 525/438 |
| 6,355,740 B1 | * | 3/2002 | Park et al. ............... 525/476 |

FOREIGN PATENT DOCUMENTS

| DE | 954456 | 12/1956 |
| DE | 1129704 | 5/1962 |
| DE | 34 12 648 C2 | 6/1987 |
| EP | 0 556 023 A1 | 8/1993 |
| JP | 50-153063 | 12/1975 |
| JP | 52-40535 | 3/1977 |
| JP | 61-258871 | 11/1986 |
| JP | 2-132165 | 5/1990 |
| JP | 4-135674 | 5/1992 |
| JP | 4-176368 | 6/1992 |
| WO | WO 97/19764 | 6/1997 |

OTHER PUBLICATIONS

Vasiléva et al. in Lakokras. Mater. Ikh Primen. 4 (1967), 18–20.

* cited by examiner

*Primary Examiner*—Robert Dawson
*Assistant Examiner*—Marc S. Zimmer
(74) *Attorney, Agent, or Firm*—Frommer Lawrence & Haug LLP

(57) ABSTRACT

The present invention provides for a silicone epoxy resin, its preparation, and the use in corrosion-inhibiting, heat-stable coatings. The inventive resins are obtained by a process which comprises reacting:

I) siloxanes of the general formula $$R_a Si(OR')_b O_{(4-a-b)/2}$$

in which
OR' is an alkoxy group with primary or secondary aliphatic alcohols,
R is identical or different and is an alkyl group or an aromatic group,
$a$ is from 0.1 to 2.0, and
$b$ is from 0.1 to 1.0, with II) one or more low molecular mass polyhydric alcohols/polyols and III) one or more resins containing epoxide groups, containing at least two 1,2-epoxide groups per molecule, at temperatures in the range from about 100 to about 160° C. with removal of the alcohol HOR' to a degree of conversion of from 20 to 80% and terminating the reaction by cooling to a temperature <about 100° C.

17 Claims, No Drawings

HEAT-STABLE, CORROSION-INHIBITING POLYORGANOSILOXANE RESINS

RELATED APPLICATIONS

This application claims priority to German application 100 35 755.5, filed on Jul. 22, 2000, herein incorporated by reference.

BACKGROUND OF THE INVENTION

1. Field of the Invention

The present invention describes a silicone epoxy resin, its preparation, and the use in corrosion-inhibiting, heat-stable coatings.

2. Background of the Invention

Crosslinked silicone resins containing T groups are highly heat-stable and have excellent film-forming properties. For these reasons they are used, for example, as electrical insulating materials, as heat-stable coatings and paints, as protective coating materials, as performance enhancers in organic binders, and as copolymers in conjunction with organic monomers or with organic resins. As silicone combination resins from this group, silicone epoxy resins are described in a large number of publications and patents. For the preparation of these resins a large number of synthesis routes are taken.

For the preparation of silicone resins containing epoxide groups, a large number of patents describe cohydrolysis of trialkoxysilanes containing epoxide groups, such as 3-glycidyloxypropyltrialkoxysilane, for example, with organotrialkoxysilanes and/or diorganodialkoxysilanes and/or triorganomonoalkoxysilanes. An overview is given by U.S. Pat. No. 5,516,858.

A disadvantage of this synthesis route is that only a maximum of one epoxide group per Si is attached; the resultant resins possess no carbinol (COH) functionality which is capable of crosslinking with SiOR. Accordingly, it is necessary to add heat-labile crosslinkers for the crosslinking reaction. The heat-labile crosslinkers critically reduce the heat stability of the resultant anticorrosion coating.

U.S. Pat. No. 4,250,074 describes the formation of an interpenetrating polymer network (IPN) of epoxy-polyamine and polysiloxane. Owing to the incompatibility of epoxy resin and silicone resin, only a small amount of silicone resin (about 2–4% of the formulation) can be used. Corresponding formulations exhibit no heat stability at temperatures above 200° C.

Epoxysilane formulations wherein said silanes act as adhesion promoters are described, for example, in EP 0 556 023 A1. The low concentrations in which the epoxysilanes are used do not make it possible to formulate heat-stable systems.

Other patents describe simple mixtures of silicones and epoxides for the preparation of coatings:

The Japanese patents JP 04176368 A2 and JP 04135674 A2 describe mixtures of various epoxides, OH-functional polydimethylsiloxanes, and titanates. Owing to the lack of attachment of silicone and epoxide and to the use of linear polydimethylsiloxanes, which only effect chain extension, the coatings obtained are not heat-stable. The coatings merely exhibit good resistance to boiling water in conjunction with high flexibility and weathering stability.

The Japanese patent JP 61258871 A2 describes a mixture of silicone resin and epoxy resin. By formulating with various inorganic pigments, heat-stable formulations are obtained. Since the epoxy resin is not stabilized by chemical reaction with silicones, the formulations described require very high silicone fractions in order to achieve temperature stability; the epoxide fraction in the formulation is, accordingly, only about 10% by weight. Correspondingly, the formulations are highly priced; the large silicone fraction impairs the anticorrosion effect owing to the increased water vapor permeability.

Mixtures of epoxy resins with linear polydimethylsiloxanes, as described in the Japanese patent JP 2132165 A2, achieve only corrosion-protecting but not heat-stable properties, owing to the absence of chemical attachment.

The curing of epoxides by organosilicone curing agents is described by Vasiléva et al. in Lakokras. Mater. Ikh Primen. 4 (1967), 18–20. The high amine content of the formulation and the lack of attachment of epoxide and silicone do not permit heat stability for the corrosion-protecting formulation.

Formulations comprising glycidyl-containing trialkoxysilanes, silicone resins and epoxides are described in WO 97/19764. The application is directed to heat-deflecting coatings. The principal binder is a silicone-modified polyether. Owing to the thermolabile polyether substituents, these formulations cannot be used for heat-stable corrosion protection.

Modification of epoxy resins with silicones is described in the Japanese patent JP 52040535 A. The reaction of methoxy- or hydroxy-functional siloxanes with epoxy resins and organic acids or anhydrides is described here. The curing agent used is a reaction product of phenyl glycidyl ether, dicyanamide and benzyltriammonium chloride. Owing to the use of this curing agent, which is not heat-stable, the resultant coatings cannot be used at elevated temperatures.

JP 50153063 A describes the modification of epoxy resin with a methylphenyl silicone resin. In a second step, the transparent silicone epoxy resin is reacted with phthalic anhydride. The carboxylic acid groups formed in the reaction with phthalic anhydride have an adverse effect on the storage stability of the silicone epoxy resin. The hydrolysis-labile Si-OR bonds, in particular, are not stable on storage in the presence of acidic groups, such as carboxylic acids (—COOH), for example.

DT 11 29 704 and DT 954 456 describe the reaction of epoxides with silanes or with silane mixtures. A disadvantage of this process is the reaction of the trialkoxyfunctional silanes, which proceeds irreproducibly. Depending on the reaction regime, insoluble silicone gels are formed. Accordingly, only small amounts of trifunctional silanes (T units) can be used; the major fraction of the silicone is formed of difunctional units (D units). This leads to coatings which, although flexible, lack sufficient hardness.

OBJECT OF THE INVENTION

It is an object of the present invention to provide a heat-stable silicone epoxy resin which is thermally curable even at relatively low temperatures below 200° C. without the use of curing agents and whose coatings possess an anticorrosion effect even after long-term temperature exposure at high temperatures above 200° C.

SUMMARY OF THE INVENTION

The present invention provides for a process for preparing silicone epoxy resins and their use for anticorrosion temperature-stable coating.

DETAILED DESCRIPTION OF THE INVENTION

The present invention provides for a process for preparing silicone resins which comprises reacting:

I) siloxanes of the general formula

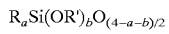

$$R_aSi(OR')_bO_{(4-a-b)/2}$$

in which
- OR' is an alkoxy group with primary or secondary aliphatic alcohols, preferably having from 1 to 8 carbon atoms,
- R is identical or different and is an alkyl group, preferably having from 1 to 8 carbon atoms or an aromatic group, preferably having from 6 to 20 carbon atoms,
- a is from 0.1 to 2.0, and
- b is from 0.1 to 1.0, with II) one or more low molecular mass polyhydric alcohols/polyols and III) one or more resins containing epoxide groups, containing at least two 1,2-epoxide groups per molecule, at temperatures in the range from about 100 to about 160° C. with removal of the alcohol HOR' to a degree of conversion of from about 20 to about 80% and terminating the reaction by cooling to a temperature <about 100° C.

A sufficient conversion may be determined, for example, by withdrawing a portion of the reaction mixture, drying it on a glass plate and determining the transparency of the coating on the glass plate. A transparent film indicates sufficient conversion. Furthermore, the conversion may be determined precisely from the amount of ethanol distilled off.

The present invention further provides for a coating produced therewith, comprising the silicone resin of the invention, and its use.

It has surprisingly been found that using one or more low molecular mass polyhydric alcohols/polyols the modification reaction of silicone resin and epoxy resin is easier and quicker to carry out. In contrast to the reaction without alcohol/polyol, it is possible in accordance with the invention to react even epoxides having average molecular masses of from about 1000 to 5000 g/mol to give transparent binders.

As low molecular mass alcohols/polyols it is possible, for example, to use linear or branched aliphatic diols, triols or tetrols, or else low molecular mass polyesterpolyols. Suitable polyols are, for example, ethylene glycol, polyethylene glycol, trimethylolethane or trimethylolpropane. Suitable polyesterpolyols possess preferably a hydroxyl functionality of from about 200 to 600 mg KOH/g polymer (i.e., OH number). A suitable polyesterpolyol is, for example, bis(2,2-dihydroxymethyl)butyl terephthalate.

The organic fraction of the silicone resins should preferably be about 50% by weight. High fractions lead to opaque, nontransparent coatings. The molecular mass may in this case be up to 1000 g/mol.

As a result of the modification with alcohols/polyols, unreacted hydroxyl groups (C—OH) are maintained after the reaction with the siloxanes, and these hydroxyl groups are suitable during the baking reaction for crosslinking, with the formation of a Si—OC bond. Accordingly, it is unnecessary when formulating to add an additional, generally thermolabile, crosslinker.

In comparison to a reaction product without alcohols/polyols, the binders of the invention may surprisingly be baked even at temperatures below 200° C.

The low molecular mass polyhydric alkyl alcohol or mixtures thereof with different alcohols is suitably used in concentrations of from about 1 to about 20% by weight, preferably from about 2 to about 15% by weight, based on the overall solids of the resultant silicone-modified epoxy binder. The suitable polyesterpolyols may be used in concentrations of from about 5 to about 80% by weight, based on the alcohol/polyol component.

$R_aSi(OR')_bO_{(4-a-b)/2}$ is a polysiloxane resin where $0.1<a<2.0$, $0.1<b<1.0$ and $a+b<4$, R being identical or different and being an alkyl group consisting of from 1 to 8 carbon atoms or an aromatic group having from 6 to 20 carbon atoms. Examples of alkyl groups include methyl, ethyl, isopropyl, n-butyl and t-butyl. An example of an aromatic group is phenyl. Where two or more radicals R are present, therefore, R may be identical or different. Particularly preferred substituents R are methyl or phenyl or mixtures of methyl and phenyl. R' of the alkoxy group is an alkyl radical consisting of from 1 to 8 carbon atoms such as, for example, methyl or ethyl.

The preparation of silicone resins per se has long been known in the literature (see W. Noll in "Chemie und Technologie der Silicone" [Chemistry and Technology of Silicones], Verlag Chemie, Weinheim (1968)) and is described, for example, in DE 34 12 648 C.

As epoxy resins it is possible to use commercially customary, preferably nonsilicone binders containing at least two 1,2-epoxide groups per molecule. Examples of suitable low molecular mass epoxy resins (MW<5000 g/mol) are commercial aliphatic epoxides (Eponex® 1513, Epodil® 757 or Epilox® M700) or aromatic epoxides (Epikote® 1001, Epikote® 1004, Epikote® 1007, Epon® 828). They are used for the modification reaction in contrast to high molecular mass epoxy resins, having for example average molecular masses above 8000 g/mol. Owing to the excessive incompatibility, it is impossible to prepare transparent binders.

In the context of the present invention, the silicone resins are prepared with particular preference by adjusting the molar ratios of COH to SiOR' groups to be greater than or equal to 1. Where the ratio is adjusted to be less than 1, and, accordingly, an excess of SiOH groups is obtained, the silicone resins formed are not stable on storage.

The production of heat-stable coatings even on long-term exposure to temperatures above 200° C. generally requires silicone contents of more than 30% by weight, based on the overall binder solids. At silicone contents above 90% by weight, the corrosion protection effect is impaired owing to the increased water vapor permeability.

The components are normally reacted with one another in proportions such that one SiOR' group corresponds approximately to one COH group, or the ratio of the COH groups to the SiOR' groups is greater than 1. Marked excesses of SiOR' lower the storage stability; the minimum curing temperature required is increased.

Examples of suitable transesterification catalysts are metal catalysts based, for example, on magnesium, cobalt, iron, aluminum, titanium, lead, zinc or tin, in the form for example of their laurates, octoates, acetates, acetylacetonates, neodecanoates or naphthalates. For instance, use may be made of titanium esters or cobalt salts of organic acids or sulfonic acids, such as p-toluenesulfonic acid or benzenesulfonic acid. Particularly suitable organotin catalysts are, for example, dibutyltin dilaurate, dibutyltin dioctoate or dibutyltin diacetate. Particularly suitable organotitanium catalysts are, for example, tetra-n-butyl titanate or tetra-isopropyl titanate.

The modification reaction is normally conducted in one or more solvents (solvent mixture). Examples of suitable aromatic solvents are toluene or xylene; examples of suitable aliphatic solvents are esters such as methoxypropyl acetate or ketones such as cyclohexanone.

In order to stabilize the silicone-modified epoxy resin, low molecular mass aliphatic monohydric alcohols, preferably having from 1 to 20 carbon atoms, such as isobutanol, for example, may be added at the end of the reaction. Alternatively, water may also be added for stabilization.

IMPLEMENTATION EXAMPLES

Reference Example

Preparation of the Silicone Resin

The alkoxypolysiloxane of the formula $(C_6H_5)_{0.5}(CH_3)_{0.5}$—$Si(OC_2H_5)_{0.8}O_{1.1}$ was prepared in accordance with DE 34 12 648 C from phenyltrichlorosilane, methylethoxypolysiloxane, ethanol and water. The silicone resin had an ethoxy content of 27.0% by weight.

Example 1

259 g of the epoxy resin Epikote® 1001, 609 g of the epoxy resin Epikote® 1007, 63 g of trimethylolpropane with 880 g of the silicone resin from the reference example were reacted with 1484 g of 1-methoxy-2-propyl acetate and 2 g of tetra-n-butyl titanate at 135° C. to a degree of conversion at which the release resin, dried on a glass plate, gave a clear, transparent coating. The amount of ethanol distilled off corresponded to a conversion of about 60%.

Comparative Example 1

259 g of the epoxy resin Epikote® 1001, 609 g of the epoxy resin Epikote® 1007, together with 880 g of the silicone resin from the reference example were reacted with 1484 g of 1-methoxy-2-propyl acetate and 2 g of tetra-n-butyl titanate at 135° C. Even at high degrees of conversion, the silicone-modified epoxy resin, dried on a glass plate, still exhibited marked turbidities in the coating. The amount of ethanol distilled off corresponded to a conversion of about 60%.

Comparative Example 2

The prior art was additionally tested by testing a mixture of methylphenyl silicone resin (21 parts by weight of P850) and an epoxy resin (6 parts by weight of Epikote® 828) in accordance with the Japanese patent JP 61258871 A2.

Example 2

The corrosion protection coatings were prepared by mixing the components by dispersing in a Skandex for one hour in accordance with Table 1.

TABLE 1

Formulation of the corrosion protection coatings (in amounts by weight)

| | Coating 1* | Coating 2 | Coating 3 |
|---|---|---|---|
| Silicone epoxy resin from Example 1 | 42.1 g | | |
| Silicone epoxy resin from Comp. Example 1 | | 42.1 g | |

TABLE 1-continued

Formulation of the corrosion protection coatings (in amounts by weight)

| | Coating 1* | Coating 2 | Coating 3 |
|---|---|---|---|
| Mixture of silicone resin and epoxy resin from Comp. Example 2 | | | 22.1 g |
| Fast black 100 | 10.4 g | 10.4 g | 10.4 g |
| Plasturit ® 0000 | 10.2 g | 10.2 g | 10.2 g |
| Heucophos ® ZPO | 5.0 g | 5.0 g | 5.0 g |
| Talkum AT extra [talc] | 4.0 g | 4.0 g | 4.0 g |
| Solvesso ® 150 | 13.0 g | 13.0 g | 13.0 g |
| Bentone SD 2 | 0.2 g | 0.2 g | 0.2 g |
| Methoxypropyl acetate | 4.5 g | 4.5 g | 24.5 g |
| Butyl acetate | 4.6 g | 4.6 g | 4.6 g |
| Xylene | 6.0 g | 6.0 g | 6.0 g |

*inventive

The coating is applied by knifecoating with a dry film thickness of from about 15 to 25 μm to a Q-panel R 46 steel panel and baked at 200° C. for 20 minutes. Homogeneous films are formed in each case.

Example 3

130 g of the epoxy resin Epikote® 1001, 305 g of the epoxy resin Epikote® 1007, 420 g of bis(2,2-dihydroxymethyl)butyl terephthalate with 880 g of the silicone resin from the reference example were reacted with 1484 g of 1-methoxy-2-propyl acetate and 2 g of tetra-n-butyl titanate at 135° C. to a degree of conversion at which the release resin, dried on a glass plate, gave a clear, transparent coating. The amount of ethanol distilled off corresponded to a conversion of about 60%.

Comparative Example 3

As a noninventive silicone polyester, the reaction product of bis(2,2-dihydroxymethyl)butyl terephthalate and silicone resin from Example 1 was prepared in accordance with Example D of DE 34 12 648 C.

The resins according to Example 3 and Comparative Example 3 were applied by knifecoating with a dry film thickness of from about 15 to 25 μm to a Q-panel R 46 steel panel and baked at 200° C. for 20 minutes. Homogenous films were formed in each case.

The results are set out in Table 2:

TABLE 2

| | Coating Example 3 | Coating Comp. Example 3 |
|---|---|---|
| Storage stability of liquid coating (4 weeks at 40° C.) | satisfactory | satisfactory |
| Corrosion protection effect (after baking) | 0 | 2 |
| Corrosion protection effect (after baking and temperature exposure 400° C. 24 h) | 0 | 2 |
| Resistance to boiling water | 0 | 1 |
| Pencil hardness | | |
| at room temperature: | 3 H | 3 H |
| at 200° C.: | 2 H | 2 H |
| Gloss at 85° (before/after temperature exposure 200° C.) | 85/80 | 86/82 |
| Temperature resistance at 400° C., 48 hours | 0 | 0–1 |
| Substrate adhesion | excellent | good |

Test Methods

Corrosion Protection Effect

The corrosion protection effect is determined by means of a salt spray test in accordance with DIN 53167 (for coatings) on a steel panel (Q-panel R 46) coated with the coating. The coatings are scored down to the metal substrate and the degree of subfilm corrosion is assessed after the salt spray test.

The same test is conducted after 48-hour temperature exposure of the sample at 400° C.

0: no subfilm corrosion after salt spray test,

1: maximum 2 mm subfilm corrosion after salt spray test,

2: 2–5 mm subfilm corrosion after salt spray test,

3: more than 5 mm subfilm corrosion after salt spray test.

Boiling Water Test

An aluminum panel coated with the corrosion protection coating (15–20 μm) was immersed for 8 hours in a container filled with boiling water. Following removal from the boiling water, the coating was examined for adhesion and blistering. The adhesion was tested by cross-cutting in accordance with DIN ISO 2409.

The evaluation was made in accordance with the following scores:

0: no effect after exposure,

1: slight blistering and/or slight loss of adhesion,

2: distinct blistering and/or severe loss of adhesion.

Temperature Resistance

The temperature resistance was determined by storage at 220° C. for a period of 16 hours, with examination of adhesion and retention of gloss. The adhesion was tested by cross-cutting in accordance with DIN ISO 2409. The evaluation was made in accordance with the following scores:

0: no effect as a result of temperature exposure,

1: slight loss of adhesion after temperature exposure,

2: severe loss of adhesion after temperature exposure.

Storage Stability

In the determination of the storage stability after 4 weeks at 40° C, viscosity stability, turbidities, separation phenomena and processing properties were assessed.

Adhesion

The adhesion was tested by cross-cutting in accordance with DIN ISO 2409.

Pencil Hardness

The pencil hardness was determined in accordance with ECCA standard T4-ISO 3270-ASTM D 3363.

The advantages of the coating of the invention become clear from the tests conducted (Table 3).

TABLE 3

Properties of the tested corrosion protection coatings:

|  | Coating 1* | Coating 2 | Coating 3 |
| --- | --- | --- | --- |
| Storage stability of liquid coating (4 weeks at 40° C.) | satisfactory | unsatis-factory (turbidity) | satisfactory |
| Corrosion protection effect (after baking) | 0 | 0 | 0 |
| Corrosion protection effect (after baking and temperature exposure 400° C. 24 h) | 0 | 1 | 2 |
| Resistance to boiling water | 0 | 0 | 1 |

TABLE 3-continued

Properties of the tested corrosion protection coatings:

|  | Coating 1* | Coating 2 | Coating 3 |
| --- | --- | --- | --- |
| Pencil hardness |  |  |  |
| at room temperature: | 3 H | 3 H | 2 H |
| at 200° C.: | 2 H | H | F |
| Gloss at 85° (before/after temperature exposure 200° C.) | 12/10 | 10/8 | 11/2 |
| Temperature resistance at 400° C., 48 hours | 0 | 0–1 | 2 |
| Substrate adhesion | satisfactory | satisfactory | satisfactory |

*inventive

In contrast to the coatings 2 and 3, the outstanding corrosion protection properties in the case of the inventive coating I are achieved even at a baking temperature of 180° C. (20 minutes).

The coating of the inventive example exhibits outstanding resistance to gasoline, such as commercially customary standard or super-grade gasoline, for example.

The above description is intended to be illustrative and not limiting. Various changes and modifications in the embodiment described herein may occur to those skilled in the art.

Those changes can be made without departing from the scope or spirit of the invention.

What is claimed is:

1. A process for preparing silicone resins which comprises reacting

I) siloxanes of the general formula

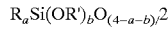
$R_aSi(OR')_bO_{(4-a-b)/2}$ in which

OR' is an alkoxy group with primary or secondary aliphatic alcohols,

R is identical or different and is an alkyl group or an aromatic group, a is from 0.1 to 2.0, and b is from 0.1 to 1.0, with II) one or more low molecular mass polyhydric alcohols/polyols and III) one or more resins containing epoxide groups, containing at least two 1,2-epoxide groups per molecule, at a temperature in the range from about 100 to about 160° C. with removal of the alcohol HOR' to a degree of conversion of from about 20 to about 80% and terminating the reaction by cooling to a temperature <about 100° C.

2. The process as claimed in claim 1, which comprises reacting

I) siloxanes of the general formula

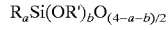
$R_aSi(OR')_bO_{(4-a-b)/2}$ in which

OR' is an alkoxy group with primary or secondary aliphatic alcohols having from 1 to 8 carbon atoms, R is identical or different and is an alkyl group having from 1 to 8 carbon atoms or an aromatic group having from 6 to 20 carbon atoms, a is from 0.1 to 2.0, and b is from 0.1 to 1.0, with II) one or more low molecular mass polyhydric alcohols/polyols and III) one or more resins containing epoxide groups, containing at least two 1,2-epoxide groups per molecule, at a temperature in the range from 100 to 160° C. with removal of the alcohol HOR' to a degree of conversion of from 20 to 80% and terminating the reaction by cooling to a temperature <100° C.

3. The process as claimed in claim 1, where the components (I), (II), and (III) are present in an amount such that molar ratio of COH to SiOR' group is greater than or equal to 1.

4. The process as claimed in claim 1, wherein OR' in the siloxane is a methoxy or ethoxy group.

5. The process as claimed in claim 1, wherein OR' in the siloxane is a methoxy group, ethoxy group, n-propoxy group, isopropoxy group, n-butoxy group, or isobutoxy group.

6. The process as claimed in claim 1, wherein R in the siloxane is a methyl and/or phenyl group.

7. The process as claimed in claim 1, which further comprises a transesterification catalyst.

8. The process as claimed in claim 7, wherein the transesterification catalyst is a titanium ester.

9. The process as claimed in claim 1, wherein the low molecular mass polyhydric alcohol is ethylene glycol, trimethylolpropane or trimethylolethane.

10. The process as claimed in claim 1, wherein the low molecular polyhydric alcohol is a polyesterpolyol having a hydroxyl functionality of from about 200 to about 600 mg KOH/g polymer.

11. The process as claimed in claim 1, wherein low molecular mass polyhydric alcohols are used in an amount of from about 1 to about 20% by weight, based on the overall solids content of the resultant binder.

12. The process as claimed in claim 1, wherein the epoxy resin does not contain any silicone.

13. The process as claimed in claim 1, wherein the silicone resin has a silicone fraction of from about 30 to about 80%, based on the overall binder solids.

14. A coating which comprises at least one silicone resin obtained by the process according to claim 1.

15. The coating according to claim 14 which further comprises at least on additional component selected from the group consisting of solvent, filler, pigment, cobinder, adhesion promoter and additive.

16. A method for inhibiting the corrosion of an article which comprises applying the coating according to claim 14 to said article.

17. A silicon resin obtained by reacting
I) siloxanes of the general formula

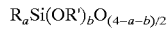

in which
OR' is an alkoxy group with primary or secondary aliphatic alcohols,
R is identical or different and is an alkyl group or an aromatic group,
a is from 0.1 to 2.0, and
b is from 0.1 to 1.0, with II) one or more low molecular mass polyhydric alcohols/polyols and IV) one or more resins containing epoxide groups, containing at least two 1,2-epoxide groups per molecule, at a temperature in the range from about 100 to about 160° C. with removal of the alcohol HOR' to a degree of conversion of from about 20 to about 80% and terminating the reaction by cooling to a temperature <about 100° C.

* * * * *